(12) United States Patent
Terada

(10) Patent No.: US 8,351,623 B2
(45) Date of Patent: Jan. 8, 2013

(54) AUDIO MIXING APPARATUS

(75) Inventor: Kotaro Terada, Hamamatsu (JP)

(73) Assignee: Yamaha Corporation (JP)

( * ) Notice: Subject to any disclaimer, the term of this patent is extended or adjusted under 35 U.S.C. 154(b) by 310 days.

(21) Appl. No.: 12/749,042

(22) Filed: Mar. 29, 2010

(65) Prior Publication Data

US 2010/0309153 A1 Dec. 9, 2010

(30) Foreign Application Priority Data

Mar. 27, 2009 (JP) .................................. 2009-78036
Mar. 27, 2009 (JP) .................................. 2009-78037

(51) Int. Cl.
*H04B 1/00* (2006.01)
*H03G 3/00* (2006.01)
*G10H 7/00* (2006.01)

(52) U.S. Cl. .............................. 381/119; 381/61; 84/645

(58) Field of Classification Search ..................... 381/61, 381/119; 84/645
See application file for complete search history.

(56) References Cited

U.S. PATENT DOCUMENTS

2004/0240686 A1* 12/2004 Gibson ......................... 381/119
2009/0028359 A1   1/2009 Terada et al.

FOREIGN PATENT DOCUMENTS

JP   2009-027574 A   2/2009

OTHER PUBLICATIONS

Digital Mixing Console M7CL Owner's Manual, Yamaha Corporation, 2005, http://www2.yamaha.co.jp/manual/pdf/pa/english/mixers/m7cl_en_om_e0.pdf, pp. 1-282.

* cited by examiner

*Primary Examiner* — Yuwen Pan
*Assistant Examiner* — George Monikang
(74) *Attorney, Agent, or Firm* — Rossi, Kimms & McDowell LLP

(57) ABSTRACT

Each of level meter block images $2_1$ to $2_m$ arranged on a touch panel display 1 displays, as a bar graph, respective signal levels of channels of a corresponding one of m blocks into which a plurality of channels are divided. The level meter block images $2_1$ to $2_m$ also serve as assignment selection buttons of an assignment selection portion 2. For each level meter block image, an image generation portion 8 generates not only an image of a bar graph but also an image which indicates respective color indicators of the respective channels such that, when a signal type of a channel indicates that there is a signal correlation between the channel and its neighboring channel, the channel has a color indicator of a connected shape shared with the neighboring channel, and synthesizes these images to output the synthesized image to an image display control circuit 3.

16 Claims, 10 Drawing Sheets

FIG.2A channel color table 11

| Ch. ID | Ch. Color |
|---|---|
| 1 | Sky Blue |
| 2 | Sky Blue |
| 3 | Sky Blue |
| 4 | Sky Blue |
| 5 | Sky Blue |
| 6 | Orange |
| 7 | Orange |
| 8 | Orange |
| 9 | Pink |
| 10 | Pink |
| 11 | Pink |
| 12 | Sky Blue |
| 13 | Sky Blue |
| 14 | Y. Green |
| 15 | Y. Green |
| 16 | Y. Green |
| 17 | Y. Green |
| 18 | Y. Green |
| 19 | Y. Green |
| 20 | Y. Green |
| 21 | Y. Green |
| 22 | Y. Green |
| ... | ... |

FIG.2B signal type table 12

| Ch. ID | Sig. Type |
|---|---|
| 1 | Mono |
| 2 | Mono |
| 3 | Stereo |
| 4 | Stereo |
| 5 | Mono |
| 6 | Type1 |
| 7 | Type1 |
| 8 | Type1 |
| 9 | Type2 |
| 10 | Type2 |
| 11 | Type2 |
| 12 | Mono |
| 13 | Mono |
| 14 | Mono |
| 15 | Mono |
| 16 | Mono |
| 17 | 5.1 |
| 18 | 5.1 |
| 19 | 5.1 |
| 20 | 5.1 |
| 21 | 5.1 |
| 22 | 5.1 |
| ... | ... |

42: channel color indicator display portion $46_1$ $46_2$ 61a $46_5$ 61b 61c $46_{12}46_{13}46_{14}46_{15}46_{16}$ 42: channel color indicator display portion $46_1$ $46_2$ 62a $46_5$ 62b 62c $46_{12}46_{13}46_{14}46_{15}46_{16}$

AUDIO MIXING APPARATUS

BACKGROUND OF THE INVENTION

1. Field of the Invention

The present invention relates to an audio mixing apparatus which has a display on an operating panel and mixes a plurality of input audio signals to output the mixed audio signals.

2. Description of the Related Art

Conventionally, a large audio mixing apparatus inputs a multiplicity of audio signals and mixes the input signals, resulting in an increased number of channels. The increase in the number of channels leads to an increased number of physical operators provided for the respective channels, resulting in a wide operating panel. Such a conventional large audio mixing apparatus involves not only an increased price but also difficult operability.

Therefore, there has been a known audio mixing apparatus having a large display on an operating panel and a plurality of assignment channel strips placed in front of the display (Manual for Digital Mixing Console M7CL" (online), Yamaha Corporation). This conventional audio mixing apparatus allows a user, by selecting a block of input channels from among input channels which are to be controlled at an input channel strip portion placed around the operating panel to assign the selected input channel block to the assignment channel strips, to process signals of the assigned input channels at the central portion as well where the display is placed. However, the selection of channels which are to be assigned to the assignment channel strips is done by use of physical operators. Disadvantageously, therefore, it is difficult for such a conventional audio mixing apparatus to allow the user to change the number of assignable channels. In addition, the conventional audio mixing apparatus requires space for the physical operators.

There has been another known audio mixing apparatus which has a touch panel sub-display provided on the right of an assignment channel strip portion to display images each indicative of respective levels of a channel group formed of a plurality of channels to allow a user to touch and select his desired one of the images to assign the channels contained in his selected image to assignment channel strips (Japanese Unexamined Patent Publication No. 2009-27574). However, the images of the conventional audio mixing apparatus simply indicate respective signal levels of the channels.

SUMMARY OF THE INVENTION

The present invention was accomplished to solve the above-described problems, and an object thereof is to provide an audio mixing apparatus which displays, on a display, level meter images each indicative of respective signal levels of a plurality of channels and allows a user to observe not only the signal levels but also various kinds of information on the respective channels.

It is a feature of the present invention to provide an audio mixing apparatus which controls a tone volume parameter of each of a plurality of channels in accordance with a current position of a fader of the each channel and displays respective signal levels of the channels as a level meter image on a display, the audio mixing apparatus including image generating means for generating the level meter image by use of respective bars of a bar graph indicative of the respective signal levels of the channels; generating an image indicative of indicators of the channels, respectively, such that the respective indicators correspond to the respective bars of the bar graph indicative of the channels, the indicators being designed such that when a signal type of a channel indicates that there is a signal correlation between the channel and its neighboring channel, the indicator of the channel has a connected shape shared with the neighboring channel; and synthesizing the generated images to display the synthesized image on the display.

In addition, the image generating means generates an image for superimposing respective fader position markers of the channels indicative of respective current positions of the faders of the channels on the respective bars of the bar graph indicative of the channels. In this case, when the signal type of the channel indicates that there is the signal correlation between the channel and its neighboring channel, the fader position marker of the channel has a connected shape shared with the neighboring channel.

Furthermore, the image generating means generates an image for superimposing respective fader position markers of the channels indicative of the respective fader positions of the channels stored as scene data on the respective bars of the bar graph indicative of the channels.

In addition, the image generating means displays the respective indicators in colors set for the channels, respectively, by user's manipulation.

Therefore, the audio mixing apparatus of the present invention displays the respective signal levels of the channels by use of the bars of the bar graph on the display, also allowing a user to concurrently observe various kinds of information such as the respective signal types of the channels, the respective current fader positions of the channels, the respective fader positions of the channels stored as scene data and the respective colors of the channels set by user's manipulation. By the level meter image displayed on the display, as a result, the user is able to see the various kinds of information of the channels in addition to the signal levels to observe respective statuses of signal processing on the respective channels on the basis of the various kinds of information.

It is another feature of the present invention that the audio mixing apparatus further includes touch detecting means for detecting an area where a user has touched on the display, the display being a touch panel display; a plurality of assignment channel strips; and channel assigning means, wherein the image generating means generates, as the level meter image, a plurality of blocks of level meter images each of which indicates a corresponding block of the channels divided into a certain number of blocks; and the channel assigning means detects a user's touch of one of the level meter images displayed on the touch panel display on the basis of an output of the detection by the touch detecting means to select a block of channels corresponding to the touched level meter image and assigns the selected channels to the assignment channel strips, respectively.

Without occupying an operating panel, therefore, the audio mixing apparatus of the present invention allows the user to select channels which the user desires to assign to the assignment channel strips. Without occupying the operating panel, more specifically, the audio mixing apparatus allows the user to select channels and assign the channels to the assignment channel strips while observing the above-described various kinds of information.

It is still another feature of the present invention to provide an audio mixing apparatus which controls a tone volume parameter of each of a plurality of channels in accordance with a current position of a fader of the each channel and displays respective signal levels of the channels as a level meter image on a display, the audio mixing apparatus including image generating means for generating the level meter image by use of respective bars of a bar graph indicative of the respective signal levels of the channels; generating an image for superimposing respective fader position markers of the channels indicative of respective current positions of the faders of the channels on the respective bars of the bar graph indicative of the channels, and synthesizing the generated images to display the synthesized image on the display.

In addition, the image generating means generates an image for superimposing respective fader position markers of the channels indicative of the respective fader positions of the channels stored as scene data on the respective bars of the bar graph indicative of the channels.

The respective fader positions of the channels stored as the scene data are, for example, respective positions of the respective faders of the channels stored as part of the most recently read scene data set.

In addition, the image generating means generates an image indicative of respective indicators of the channels in respective colors set for the respective channels by user's manipulation such that the respective indicators correspond to the respective bars of the bar graph of the channels.

Therefore, the audio mixing apparatus of the present invention displays the respective signal levels of the channels as the bars of the bar graph on the display, also allowing the user to concurrently observe various kinds of information such as the respective current fader positions of the channels, the respective fader positions of the channels stored as scene data, and the respective colors of the channels set by user's manipulation. By the level meter image displayed on the display, as a result, the user is able to see the various kinds of information of the respective channels in addition to the signal levels to observe respective statuses of signal processing on the respective channels on the basis of the various kinds of information.

It is a further feature of the present invention that the audio mixing apparatus further includes touch detecting means for detecting an area where a user has touched on the display, the display being a touch panel display; a plurality of assignment channel strips; and channel assigning means, wherein the image generating means generates, as the level meter image, a plurality of blocks of level meter images each of which indicates a corresponding block of the channels divided into a certain number of blocks; and the channel assigning means detects a user's touch of one of the level meter images displayed on the touch panel display on the basis of an output of the detection by the touch detecting means to select a block of channels corresponding to the touched level meter image and assigns the selected channels to the assignment channel strips, respectively.

Without occupying an operating panel, therefore, the audio mixing apparatus of the present invention allows the user to select channels which the user desires to assign to the assignment channel strips. Without occupying the operating panel, more specifically, the audio mixing apparatus allows the user to select channels and assign the channels to the assignment channel strips while observing the above-described various kinds of information.

Furthermore, the present invention is also applied to an audio mixing program that enables a computer to realize the capabilities of the audio mixing apparatus.

BRIEF DESCRIPTION OF THE DRAWINGS

FIG. 2A is a concrete example of a channel color table indicated in FIG. 1;

FIG. 2B is a concrete example of a signal type table indicated in FIG. 1;

DESCRIPTION OF THE PREFERRED EMBODIMENT

Figure 1:
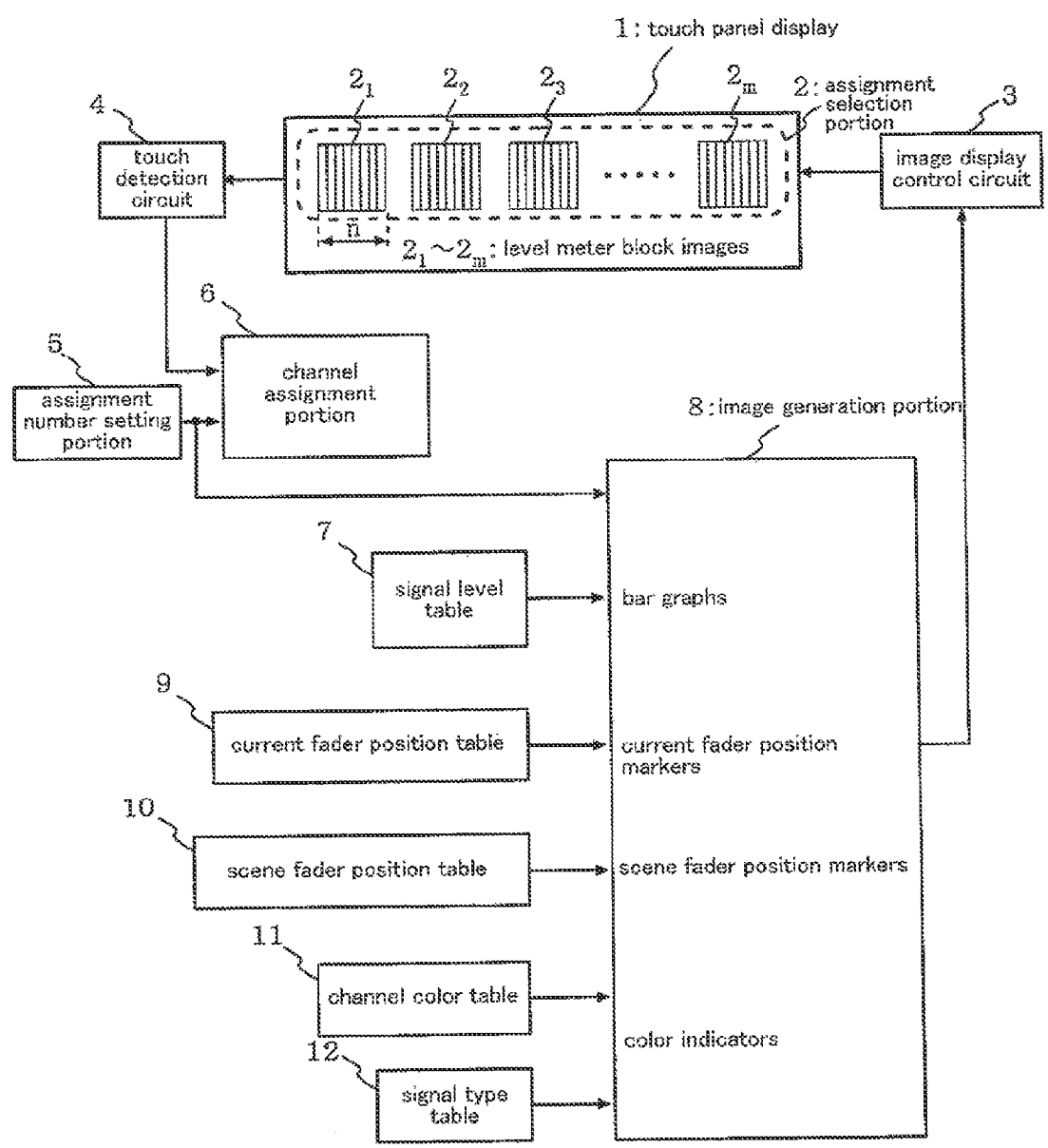
FIG. 1 is a functional block diagram indicating a configuration of an audio mixing apparatus according to an embodiment of the present invention.

FIG. 1 is a functional block diagram indicative the configuration of an audio mixing apparatus according to an embodiment of the present invention. In respective channels for signal processing (hereafter simply referred to as channels), the audio mixing apparatus controls respective properties of signals input to the respective channels and outputs the signals. On the audio mixing apparatus, for example, respective fader operators of the respective channels are used to control respective values of tone volume parameters of the respective channels. On an operating panel of the audio mixing apparatus, a touch panel display 1 is provided. On a part of the display 1, level meter block images $2_1$ to $2_m$ are laterally placed in a row in the order of channel numbers. The level meter block images $2_1$ to $2_m$ indicate respective signal levels of all the channels used on the audio mixing apparatus as bar graphs, the channels being divided into a given number m of blocks so that each level meter block image will display respective signal levels of channels belonging to its corresponding block.

Figure 3:
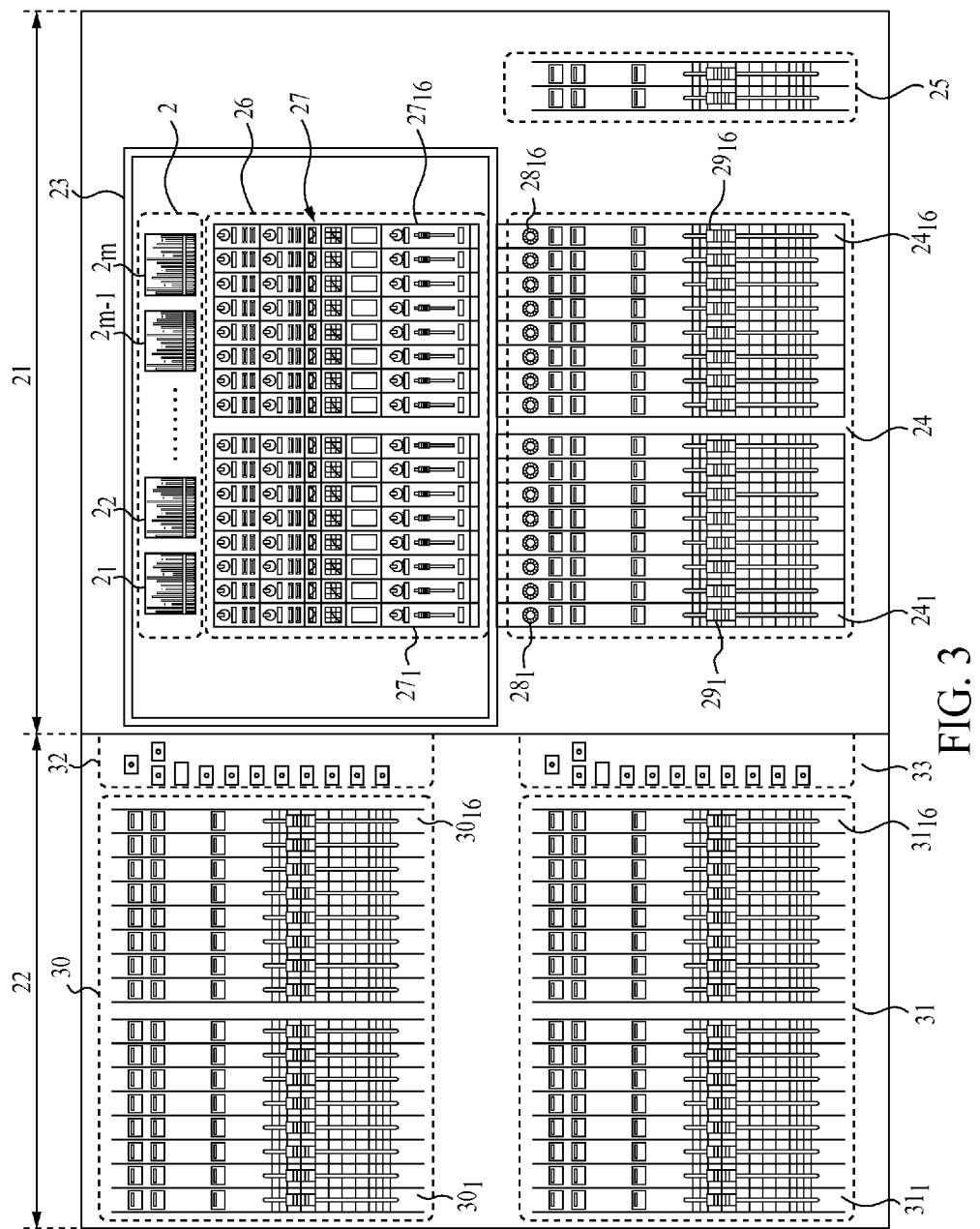
FIG. 3 is an entire layout indicative of an example operating panel of the embodiment indicated in FIG. 1, a display screen of the operating panel displaying a first concrete example of an assignment selection portion and an overview portion.

On the operating panel, a plurality of assignment channel strips $24_1$ to $24_{16}$ which will be described later in detail referring to FIG. 3 are arranged. The respective level meter block images $2_1$ to $2_m$ also serve as assignment selection buttons (virtual switches) for selecting a channel block which is to be assigned to the assignment channel strips $24_1$ to $24_{16}$. A touch detection circuit 4 detects an area where a user has touched on the touch panel display 1. On the detection of a user's touch of one of the level meter block images $2_1$ to $2_m$ divided into the plurality (m) of blocks, a channel assignment portion 6 selects a plurality of channels belonging to the touched level meter block image and assigns the selected channels to the assignment channel strips $24_1$ to $24_{16}$, respectively, on the basis of the output detected by the touch detection circuit 4 and an assignment number setting portion 5.

The assignment number setting portion 5 determines a number n of assignable channel strips of the assignment channel strips 24. An image generation portion 8 determines a number m of splits on the basis of the total number of channels used on the audio mixing apparatus and the assignable number n, and then generates m blocks of level meter images into which the plurality of channels are divided. Usually, every assignment channel strip $24_1$ to $24_{16}$ is assigned a channel. However, the number of channels which configure a block may vary among the level meter block images $2_1$ to $2_m$ as long as the number of channels configuring a block is smaller than the total number of assignment channel strips $24_1$ to $24_{16}$. Furthermore, a channel may belong to different blocks.

The image generation portion 8 generates fundamental part of the level meter block images $2_1$ to $2_n$, on the basis of bar graphs ($43_1$ to $43_{16}$ of FIG. 4A) indicative of signal levels of the respective channels written into a signal level table 7. In addition, the image generation portion 8 also generates images for superimposing current fader positions markers ($44_1$ to $44_{16}$ of FIG. 4A) of respective channels on respective bars of the bar graphs of the channels. The current fader position markers of respective channels indicate the respective positions of faders of the channels written into a table 9 by the respective vertical positions of the faders or the like.

A scene fader position table 10 stores respective positions of the faders of the respective channels as scene data at the time of storage of a scene. Furthermore, the image generation portion 8 generates images for superimposing scene fader position markers ($45_1$ to $45_{16}$ of FIG. 4A) of the respective channels on the respective bars ($43_1$ to $43_{16}$ of FIG. 4A) of the bar graphs of the channels. The scene fader position makers of the respective channels indicate the respective positions of the faders of the channels stored in the scene fader position table 10 as scene data by the respective vertical positions of the faders or the like.

A scene is a function of storing respective positions of the fader operators, respective on/off states of key switches of the respective channels provided on the operating panel, various parameter values such as send levels and equalizers of the respective channels and the like as a single unit of scene data in a scene memory at the time of storage and putting the current positions of the faders, on/off states, various parameter values and the like back to the respective states indicated by the stored scene all at once in response to a recall of the scene.

The scene fader position table 10 stores scene fader positions as part of the above-described scene data. In the scene fader position table 10, more specifically, the scene data sets are stored in a manner in which each scene data set is given a scene number. In other words, scene fader positions are stored in each scene data set as part of the data. On the basis of the scene fader position table 10, the image generation portion 8 generates images for superimposing the respective scene fader position markers of the channels on the respective bars of the bar graphs of the channels. The respective scene fader position markers of the channels indicate of the respective fader positions of the channels stored as part of lastly, in other words, as part of the most recently recalled scene data set.

Instead of using the most recently recalled scene data set, a user may designates a scene number to select a scene data set of the designated scene number from among the stored scene data sets so that the image generation portion 8 can generate images for superimposing scene fader position markers on the respective bars of the bar graphs of the channels. The scene fader position markers indicate fader positions stored as part of the selected scene data set. In this case, the user is able to previously check (preview) changes in the respective fader positions resulting from a recall of the selected scene data set.

As indicated in FIG. 2A, a channel color table 11 stores respective colors assigned to the respective channels by user's manipulation. The image generation portion 8 displays respective channel color indicators ($46_1$ to $46_{16}$ of FIG. 4A) by use of the respective colors of the channels stored in the channel color table 11 so that each channel color indicator will be correlated with a bar graph ($43_1$ to $43_{16}$) of each channel.

As indicated in FIG. 2B, a signal type table 12 stores respective signal types assigned to the respective channels by user's manipulation. The signal types are employed in order to indicate whether signals of a channel are correlated with those of its neighboring channel. In a case where the signal type of a channel indicates that there is a signal correlation between the channel and its neighboring channel, the respective faders of the channel and its neighboring channel are controlled to be positioned at the same position. In a case where the signal type of a channel stored in the signal type table 12 indicates that signals of the channel are correlated with those of its neighboring channels, the image generation portion 8 generates an image of a channel color indicator having a connected shape shared between the channel and its neighboring channels which are correlated with each other as indicated in $51a$ to $51c$ of FIG. 4B. As a result, the channel color indicator shows the user the correlation of the signals between the channel and its neighboring channels at a glance. The channel correlated with its neighboring channels is controlled in conjunction with the neighboring channels so that respective values of most parameters (except pan and delay) such as the fader position of the channel will conform to those of its neighboring channels (by copy of parameter values of one channel to the other channels). In a case where the user desires to vary respective values of a parameter among the channels which are to be controlled in conjunction, those channels are to be controlled by "pan".

Figure 4A:
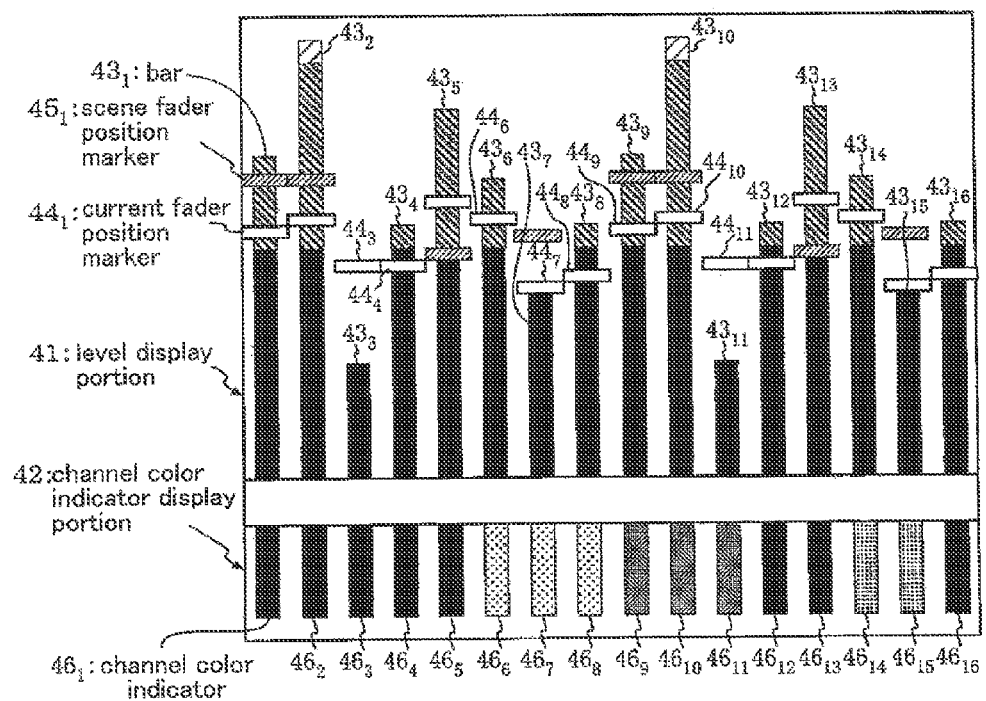
FIG. 4A is a concrete example of a level meter block image indicated in FIG. 1 and FIG. 3, every channel of the example being mono.
Figure 4B:
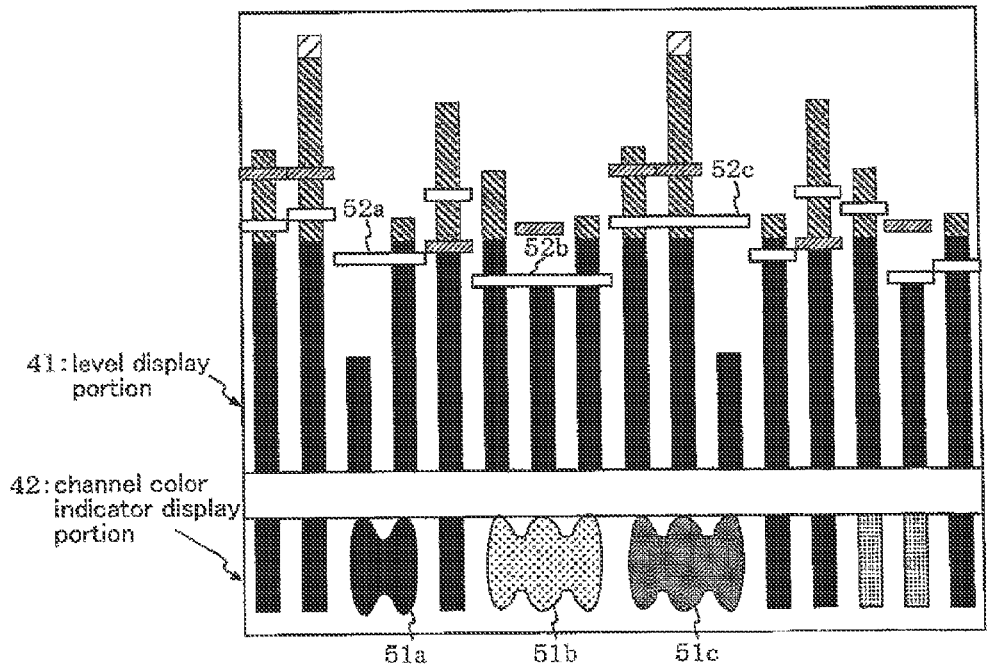
FIG. 4B is a concrete example of the level meter block image indicated in FIG. 1 and FIG. 3, the example having channels of different signal types.

In the case where the signal type of the channel indicates that the signals of the channel are correlated with those of its neighboring channels, furthermore, the image generation portion 8 may generate an image of the current fader position marker so that the channel and its neighboring channels which are correlated with each other will share a current fader position marker having a connected shape as indicated in $52a$ to $52c$ of FIG. 4B.

For each of the level meter block images $2_1$ to $2_m$, the image generation portion 8 synthesizes the image of the bar graph indicative of corresponding channels, the image of the fader position markers of the channels, the image of the fader position markers of the channels of the scene data and the image of the indicators of the channels. Then, the image generation portion 8 outputs the synthesized image to an image display control circuit 3 to display each of the level meter block images $2_1$ to $2_m$ on the touch panel display 1.

FIG. 2A and FIG. 2B are concrete examples of the channel color table 11 and the signal type table 12 indicated in FIG. 1, respectively. The examples indicated in the figures have first to twenty second input channels, respectively. In the example of FIG. 2A, the channel color table 11 indicates names of colors as information for identifying channel colors. Each channel color is obtained from hue into which tone (lightness, saturation of color) is incorporated.

On the basis of the channel colors, the user is able to identify signals which are being processed in the respective channels. The channel colors are set by the user. More specifically, the channel colors of the signals which are processed in the respective channels are defined according to "part" indicative of source of signal. For example, the channel colors are defined according to parts of musical instruments. That is, the channel colors are defined as follows: "sky blue" indicative of guitar; "orange" indicative of vocal; "pink" indicative of vocal; and "yellow green" indicative of drum. Furthermore, the channel colors are also defined according to voice range such as soprano and tenor. It is preferable that the channel color of gray indicates that the channel to which gray is assigned is not used or disabled.

FIG. 2B indicates the signal type table 12. More specifically, the signal types for indicating correlation of signals among neighboring channels include "mono", "stereo" and "5.1 surround". In addition, the signal type table 12 may include signal types, such as "type 1" and "type 2" indicated in the figure, defined by the user in consideration of the correlation of signals among neighboring channels. In a case where a performer uses a microphone to input signals, a channel for processing the signals is assigned "mono". In a case where a performer uses two microphones for stereo or six microphones for 5.1 surround to input signals, respective channels for processing the signals are assigned "stereo" or "5.1 surround", respectively.

In a case where the user desires to assign "stereo" to ch. ID=3, 4 (input channels 3 and 4), the user is to assign "stereo" to ch. ID=3 which is a lower number. To ch. ID=4 as well, "stereo" is automatically assigned. In addition, sub-channels are also automatically assigned from a lower number to a higher number. That is, ch. ID=3 is assigned "L" (left), whereas ch. ID=4 is assigned "R" (right). In a case where the user desires to assign "5.1 surround" to ch. ID=17 to 22 (input channels 17 to 22), the user is to assign "5.1 surround" to ch. ID=17 which is the lowest number. To ch. ID=18 to 22 as well, "5.1 surround" is automatically assigned. In addition, sub-channels are also automatically assigned from a lower number to higher numbers. That is, ch. ID=17 is assigned "L" (left front). Ch. ID=18 is assigned "R" (right front). Ch. ID=19 is assigned "C" (front center). Ch. ID=20 is assigned "Ls" (left rear). Ch. ID=21 is assigned "Rs" (right rear). Ch. ID=22 is assigned "LFE" (sub-woofer). As for channel color of these neighboring channels whose signals are correlated with each other, it is preferable that these channels are assigned a channel color of the channel of the lowest number, for example.

FIG. 3 is an entire layout of an example operating panel of the embodiment indicated in FIG. 1. The operating panel is designed such that a main top panel 21 is connected to a sub-top panel 22. In this figure, parts which are not directly related to the present invention are omitted. In some cases, sub-displays can be placed in a blank of the main top panel 21 and a blank of the sub-top panel 22, respectively. At the center of the upper part of the main top panel 21, a touch panel main display 23 is placed which corresponds to the touch panel display 1 of FIG. 1. Below the main display 23 (at a near side seen from the user), assignment channel strips $24_1$ to $24_{16}$ are arranged as an assignment channel strip portion 24. On the right side of the assignment channel strip portion 24, a stereo/mono master fader portion 25 for both stereo output and monaural output is placed.

On the sub-top panel portion 22, channel strips $30_1$ to $30_{16}$ are arranged as an upper channel strip portion 30, whereas channel strips $31_1$ to $31_{16}$ are arranged as a lower channel strip portion 31. From among all the channels used on this audio mixing apparatus, channels belonging to a selected bank are recalled to be assigned to the channel strips $30_1$ to $30_{16}$. The selection is made by the manipulation of a selection key switch (a physical operator) of an assignment selection portion 32. Each of the channel strips $30_1$ to $30_{16}$ has physical operators such as a plurality of key switches and a fader operator. In accordance with the manipulation of the respective fader operators, respective tone volume parameters of the channels assigned to the channel strips $30_1$ to $30_{16}$ are controlled. The signal processing on each channel is performed in accordance with various parameter values written into a current memory.

Types of the channels include input channels for input, MIX channels for output, MATRIX channels, stereo output channels A and B, and a DCA (Digital Controlled Amplifier) group for group control. On the audio mixing apparatus, sixteen banks are provided, with a selected one of the banks being assigned to the channel strips $30_1$ to $30_{16}$. As for conventional audio mixing apparatuses, such banks are referred to as layers. Some of the conventional apparatuses, such as the above-described conventional apparatus, do not have banks (layers). The channel strips $31_1$ to $31_{16}$ are configured similarly. Therefore, detailed description thereof will be omitted.

A detailed description about the main top panel 21 will be given again. The selection of channels for assigning to the assignment channel strips $24_1$ to $24_{16}$ is done by a touch of one of the level meter block images $2_1$ to $2_m$. Primarily, assignable channels are those currently assigned to the channel strips $30_1$ to $30_{16}$, $31_1$ to $31_{16}$ of the sub-top panel 22.

In addition, channels which are not currently assigned to the channel strips $30_1$ to $30_{16}$, $31_1$ to $31_{16}$ are also assignable. More specifically, any channels (input channels, output channels, and DCA group channels: generally speaking, any channels that can be used on this audio mixing apparatus) assignable to the assignment channel strips $24_1$ to $24_{16}$ can be assigned as a block. Furthermore, the user is allowed to freely define the total number of channels which configure a block and to specify channels that are to belong to the block to assign the channels to the assignment channel strips $24_1$ to $24_{16}$.

In order to serve as buttons for selecting a block, therefore, the level meter block images $2_1$ to $2_m$ display respective signal levels of channels which configure m number of blocks each assignable to the assignment channel strips $24_1$ to $24_{16}$.

However, the size of each level meter block image decreases with an increase in the number of channels whose signal levels are to be displayed. In order to prevent the reduction in the size, therefore, the plurality of blocks each assignable to the assignment channel strips $24_1$ to $24_{16}$ may be divided into two groups, for example (e.g., sixteen blocks divided into one group of 1st to 8th blocks and the other group of 9th to 16th blocks), to display blocks belonging to one of the divided groups on an area of an assignment selection portion 2 so that the user can switch between the two groups by a manipulation of a display switch button displayed on the screen of the main display 23 to display the user's desired group of blocks.

The assignment channel strips $24_1$ to $24_{16}$ have not only a plurality of key switches such as channel selection buttons and fader operators $29_1$ to $29_{16}$ but also encoders $28_1$ to $28_{16}$, respectively. To each of the encoders $28_1$ to $28_{16}$, a parameter type is previously assigned. In accordance with the respective amounts of rotation of the respective encoders $28_1$ to $28_{16}$, respective values of the assigned parameters of the channels assigned to the assignment channel strips $24_1$ to $24_{16}$ change. Below the assignment selection portion 2, an overview portion 26 is provided where a virtual assignment channel strip portion 27 is displayed. The assignment channel strip portion 27 is arranged so as to be seen by the user as if the assignment channel strip portion 27 were seamlessly linked to the assignment channel strip portion 24 provided on the main top panel 21 in the vertical direction.

What is displayed on the overview portion 26 variously change. In the shown example, assignment channel strips $27_1$ to $27_{16}$ indicate current parameter values by values, graphs, rotation of respective knobs and the like, respectively. By a user's touch of a certain area of a channel strip, a certain parameter switches between on and off, or a certain type of parameter is selected. In a case of a selection of a certain type of parameter, the parameter type is assigned to an encoder of a corresponding channel strip, the encoder being included in the encoders $28_1$ to $28_{16}$.

FIG. 4A and FIG. 4B are concrete examples of the level meter block images $2_1$ to $2_m$ indicated in FIGS. 1 and 3. FIG. 4A and FIG. 4B indicate a case in which the input channels 1 to 16 are assigned to the level meter block image $2_1$. FIG. 4A indicates a case where every channel is "mono". FIG. 4A indicates a level display portion 41 and a channel color indicator display portion 42 provided below the level display portion 41.

Bars $43_1$ to $43_{16}$ of a bar graph indicate respective signal levels of the input channels 1 to 16 measured at a certain point (metering point). The signal level of −18 dB or less is indicated by a green bar, whereas the signal level exceeding −18 dB but being 0 dB or less is indicated by a yellow bar. The signal level exceeding 0 dB is indicated by a red bar. The metering point is selected from among alternatives by the user for the input channels and for the output channels, respectively. For the DCA group, the levels of the signals having the largest level at a post fader position of the channels which configure the group are displayed.

Current fader position markers $44_1$ to $44_{16}$ are indicators indicative of respective positions of fader operators of the respective channels 1 to 16 (in the figure, signs for the markers $44_2$, $44_5$, and $44_{12}$ to $44_{16}$ are omitted). Scene fader position markers $45_1$ to $45_{16}$ are indicators indicative of respective positions of the fader operators of the channels 1 to 16 stored as a scene (in the figure, signs for the markers $45_2$ to $45_{16}$ are omitted). The hue and lightness of the scene fader position markers $45_1$ to $45_{16}$ are determined so that the scene fader position markers $45_1$ to $45_{16}$ are seen like shades of the current fader position markers $44_1$ to $44_{16}$, respectively. In a case where the scene fader position markers $45_1$ to $45_{16}$ are overlaid on the current fader position markers $44_1$ to $44_{16}$, the scene fader position markers $45_1$ to $45_{16}$ are displayed to be hidden behind the current fader position markers $44_1$ to $44_{16}$.

In a case where the scene fader position markers $45_1$ to $45_{16}$ indicate respective positions of the faders of the lastly, that is, most recently recalled scene data set included in the scene data sets, the respective differences between the respective positions of the scene fader position markers $45_1$ to $45_{16}$ and those of the current fader position markers $44_1$ to $44_{16}$ show the user, at a glance, how the user has intentionally moved the respective fader operators since the most recent recall of the scene data set. Rectangular channel color indicators $46_1$ to $46_{16}$ are displayed as if the bars $43_1$ to $43_{16}$ of the respective input channels 1 to 16 were extended downward.

FIG. 4B indicates a concrete example of a case where the signal types are set in accordance with the signal type table 12 of FIG. 2B. In FIG. 4B, the bars $43_1$ to $43_{16}$ (whose signs are omitted in the figure) and the scene fader position markers $45_1$ to $45_{16}$ (whose signs are omitted in the figure) are the same as those of FIG. 4A. As for neighboring channels sharing the same signal types, in the shown example, that is, the input channel groups 3 and 4, 6 to 8, and 9 to 11, the respective tone volume parameter values of each neighboring channel group are controlled in conjunction. In spite of separate current fader position markers $44_3$ to $44_4$, $44_6$ to $44_8$, and $44_9$ to $44_{11}$ in FIG. 4A, therefore, these current fader position markers are indicated in FIG. 4B such that the current fader position markers of each neighboring channel group are placed at the same position (same height) (signs of $44_1$ to $44_{16}$ are omitted in the figure). In FIG. 4B, furthermore, these current fader position markers are indicated as common current fader position markers 52a, 52b, 62c.

In the channel color indicator display portion 42, the channels having the signal types correlated with their respective neighboring channels have channel color indicators which are shaped, as indicated by channel color indicators 51a to 51c, as if original rectangles of each neighboring channel group were melted into one another to have right and left sides protruding outward with only the middle parts of the respective original rectangles in the vertical direction being combined with each other. The original rectangles of the channels having the signal types indicative of the signal correlation among the neighboring channels are altered automatically to be shaped like the combined channel color indicators. Channels of "5.1 surround" which are not shown have a similar channel color indicator obtained by combining six neighboring original rectangles with each other so that only the middle parts of the respective rectangles in the vertical direction can be combined with each other. The channel color indicators 51a to 51c indicated in FIG. 4B enable the user to recognize the correlation of the signals of each neighboring channel group (the number of channels correlated with each other) by the number of protrusions which protrude upward and downward.

Furthermore, the respective current fader position markers 52a to 52c eliminate the borders between the respective neighboring channels so as to indicate the respective signal correlations among the respective neighboring channels. In a case where the signal types are also to be stored as scene data, borders between the neighboring channels of the scene fader position markers provided for the channels having the signal types indicative of respective signal correlations among the respective neighboring channels may be eliminated at the time of storage so that the scene fader position markers will be displayed without the borders.

Figure 5A:
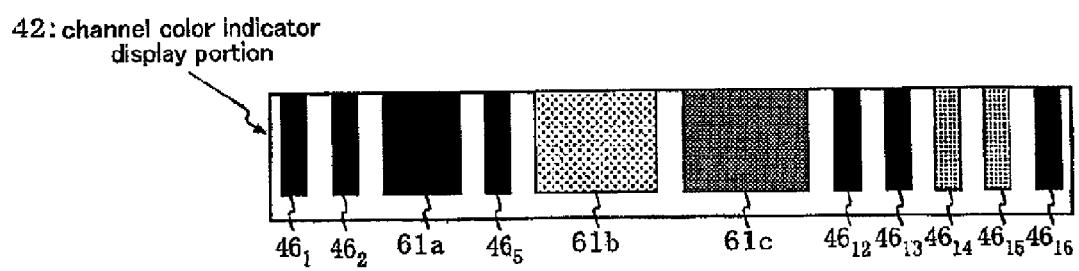
FIG. 5A is another concrete example of a channel color indicator display portion indicated in FIG. 4B.
Figure 5B:
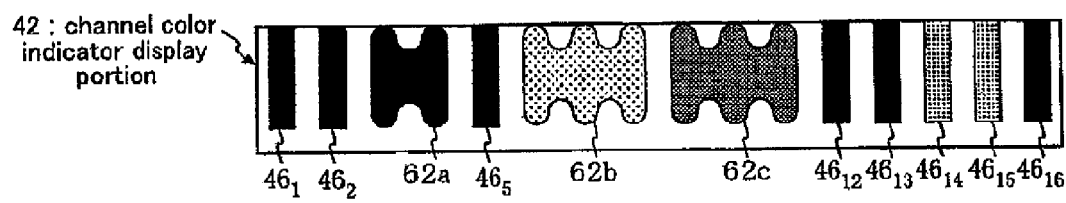
FIG. 5B is the other concrete example of the channel color indicator display portion indicated in FIG. 4B.

FIG. 5A and FIG. 5B are other concrete examples of the channel color indicator display portion 42 indicated in FIG. 4B. FIG. 5A indicates an example of channel color indicators 61a to 61c each shaped like a rectangle obtained by combining a plurality of neighboring original rectangles indicative of channels of a signal type indicative of a signal correlation among neighboring channels. Channels of "5.1 surround" have a rectangular channel color indicator obtained by combining six neighboring original rectangles with each other to form one rectangle. FIG. 5B indicates an example of channel color indicators 62a to 62c of connected shapes each obtained by connecting a plurality of neighboring original rectangles with each other so that only the middle parts of the respective rectangles in the vertical direction can be connected with each other, with edges being rounded. Channels of "5.1 surround" have a channel color indicator of a similar shape obtained by combining six neighboring original rectangles with each other so that only the middle parts of the respective rectangles in the vertical direction can be combined with each other.

Figure 6:
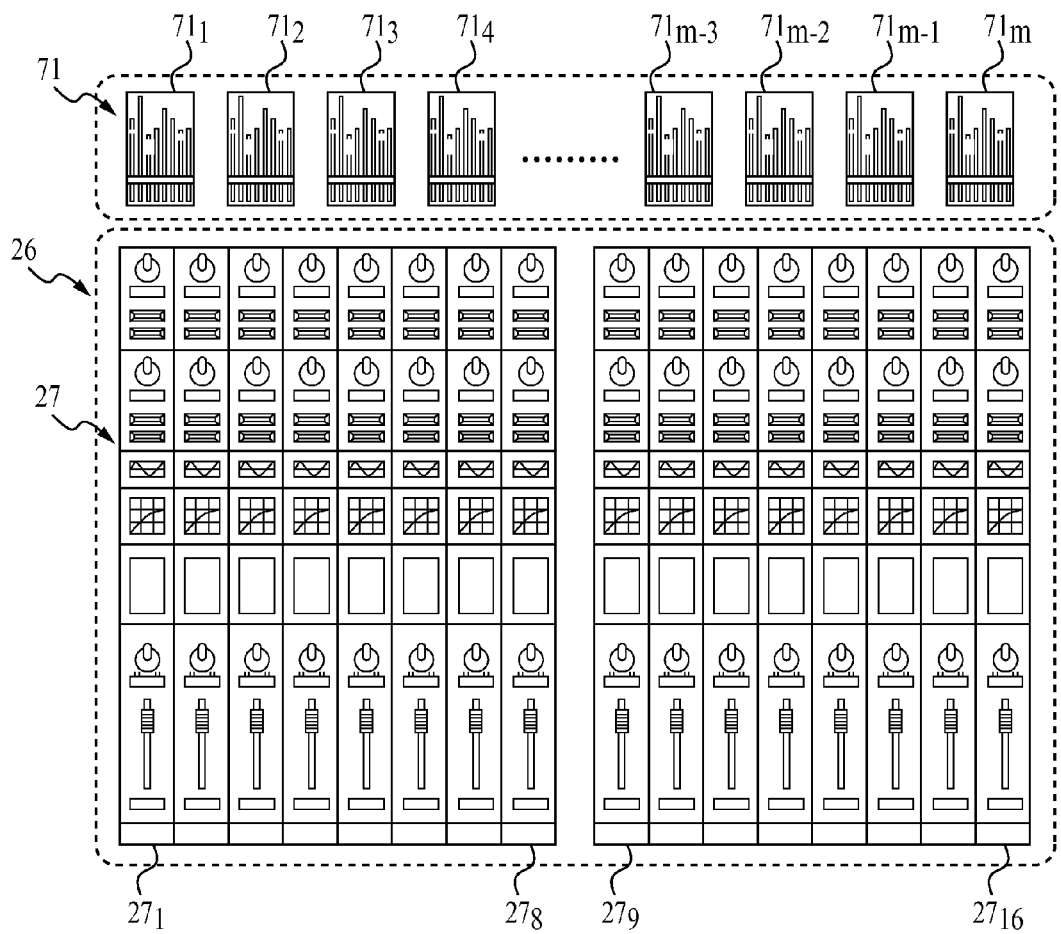
FIG. 6 is a display screen indicative of a second concrete example of the assignment selection portion and the overview portion displayed on a main display indicated in FIG. 3.

FIG. 6 is a display screen indicative of the second concrete example of the assignment selection portion 2 and the overview portion 26 displayed on the main display 23 indicated in FIG. 3. In some occasions, the user desires to fixedly assign certain channels to some of the assignment channel strips $24_1$ to $24_{16}$. In other occasions, furthermore, the user desires to use some of the assignment channel strips $24_1$ to $24_{16}$ for a purpose other than the control of channels.

In such occasions, the user is allowed to change the value of "n" by use of the assignment number setting portion 5 so that only some of the assignment channel strips $24_1$ to $24_{16}$, that is, only the number n of the assignment channel strips $24_1$ to $24_{16}$ can be assigned channels. In this case, the number of channels contained in each of the level meter block images $2_1$ to $2_m$ is also "n". As a result, unless the total number of assignable channels is changed by the assignment selection portion 2, the number m of blocks displayed on the level meter display area is to increase. In the example of FIG. 6, letting n=8, the assignment channel strips $24_9$ to $24_{16}$ of the right half are defined as fixed channel strips. Unless the total number of channels used on the audio mixing apparatus changes, the number m of blocks of level meter block images $71_1$ to $71_m$ is to be doubled.

Figure 7:
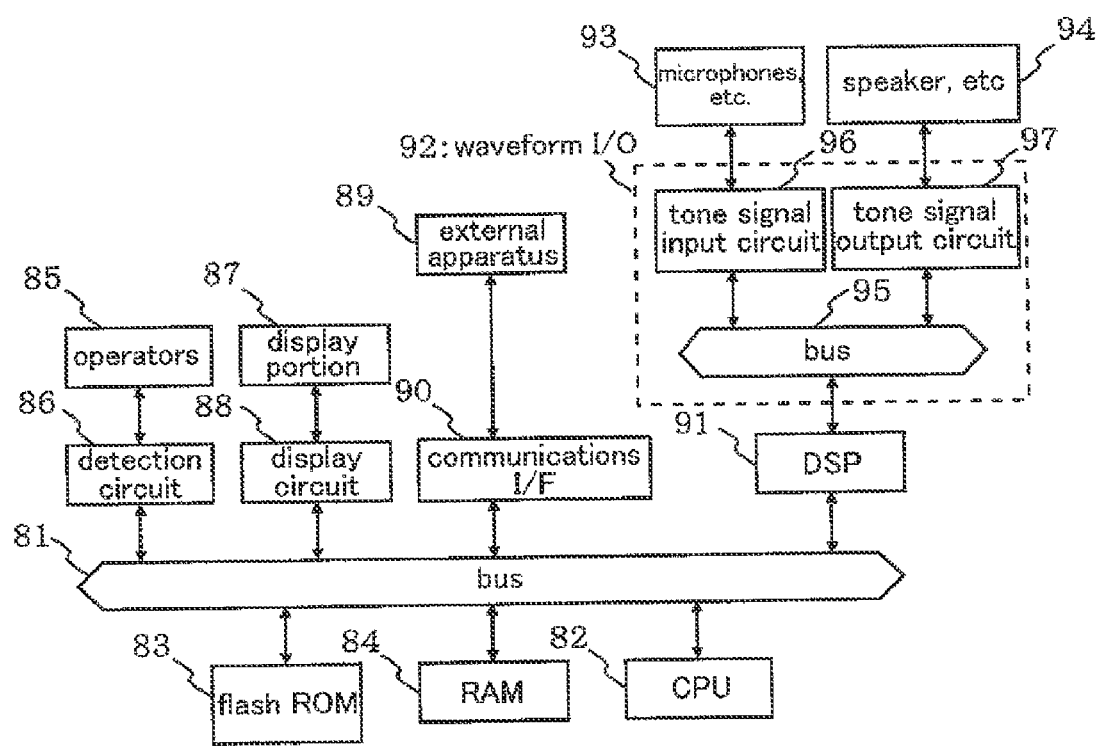
FIG. 7 is a block diagram indicative of an example configuration of hardware which realizes the embodiment indicated in FIG. 1.

FIG. 7 is a block diagram indicative of an example configuration of hardware which realizes the embodiment indicated in FIG. 1. A bus 81 connects among a later described CPU (Central Processing Unit) 82, a flash ROM (Read Only Memory) 83, a RAM (Random Access Memory) 84 and other hardware blocks. The CPU 82 controls the entire operation of the audio mixing apparatus by use of the RAM 84 which temporarily stores various kinds of data in accordance with computer programs stored in the flash ROM 83, also transferring parameter values such as tone volume parameters to a DSP (Digital Signal Processor) 91 and retrieving signal level values from the DSP 91.

The signal level table 7 and the current fader position table 9 indicated in FIG. 1 are stored in the RAM 84 as part of current memory. The scene fader position table 10, the channel color table 11 and signal type table 12 are stored in the flash ROM 83. The computer programs enable the CPU 82 to realize respective functions of the assignment number setting portion 5, the channel assignment portion 6 and image generation portion 8 indicated in FIG. 1 and functions of writing/reading data into/from various tables such as the signal level table 7.

Operators 85 include key switches, encoders, fader operators and touch panels provided for the channel strips. The fader operators are motor-driven moving faders, for example. A display portion 87 is an LED (light emitting diode) display. An external apparatus 89 is a personal computer, for example. By an administration program installed on the personal computer, the personal computer is able to remote-control the audio mixing apparatus, edit parameters and store set parameter values.

The DSP 91 realizes the signal processing function of the audio mixing apparatus in accordance with a micro-program under the control of the CPU 82. The DSP 91 inputs tone signals from a plurality of audio input apparatuses such as microphones 93 through a waveform I/O (waveform input/output data interface) 92. The DSP 91 then performs digital signal processing such as control of attenuator, equalizer, compressor, gate, expander, fader and send level on a plurality of channels, also mixing output signals of the channels to output tone signals to a plurality of audio output apparatuses such as a speaker 94, a monitoring headphone and a recording apparatus through the waveform I/O 92. The waveform I/O 92, which is realized, as principles, by connecting the DSP 91, a tone signal input circuit 96 and a tone signal output circuit 97 to an audio bus 95, has a plurality of input ports and a plurality of output ports.

FIGS. 8 to 13 are flowcharts of programs carried out by the CPU 82 in order to realize the operation of the embodiment described with reference to FIG. 1.

Figure 8:
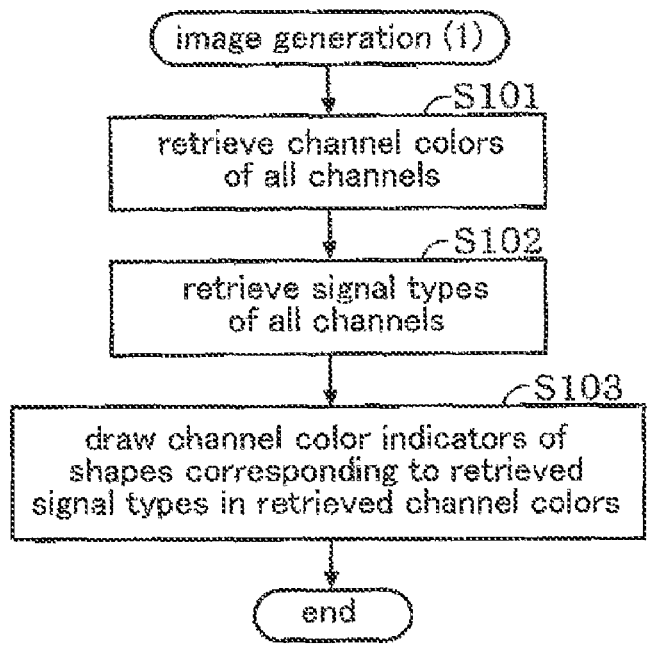
FIG. 8 is a flowchart of an image generation program (1) for generating images of the channel color indicator display portion.

An image generation program (1) indicated in FIG. 8 is carried out when the contents of the channel color table 11 of FIG. 2A or the signal type table 12 of FIG. 2B have been changed or when the refreshing of the level meter images has been demanded. In this image generation program (1), the CPU 82 retrieves respective channel colors of all the channels from the channel color table 11 (S101), and also retrieves respective signal types of all the channels from the signal type table 12 (S102). The CPU 82 then draws color indicators of shapes corresponding to the retrieved signal types in the retrieved channel colors to generate an image of the channel color indicator display portion 42 of FIG. 4A and FIG. 4B of each of the level meter block images $2_1$ to $2_m$ (S103).

Figure 9:
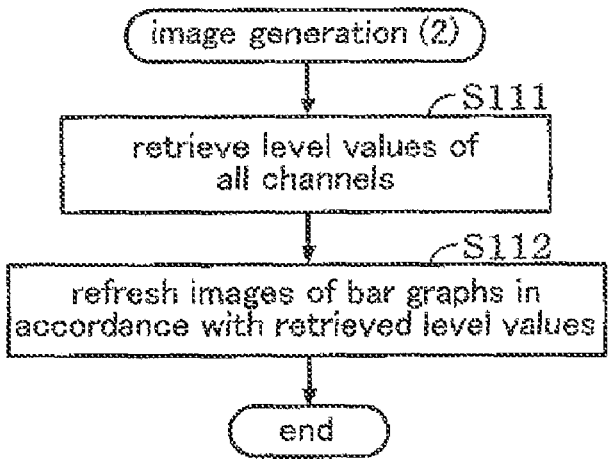
FIG. 9 is a flowchart of an image generation program (2) for generating images of bar graphs of the channels.

An image generation program (2) indicated in FIG. 9 is carried out at regular time intervals or when the refreshing of the level meter images has been demanded. In the image generation program (2), the CPU 82 retrieves respective level values of all the channels (S111). The CPU 82 then refreshes bar graph images in accordance with the retrieved level values to generate an image of the bars $43_1$ to $43_{16}$ of FIG. 4A and FIG. 4B of each of the level meter block images $2_1$ to $2_m$ (S112).

Figure 10:
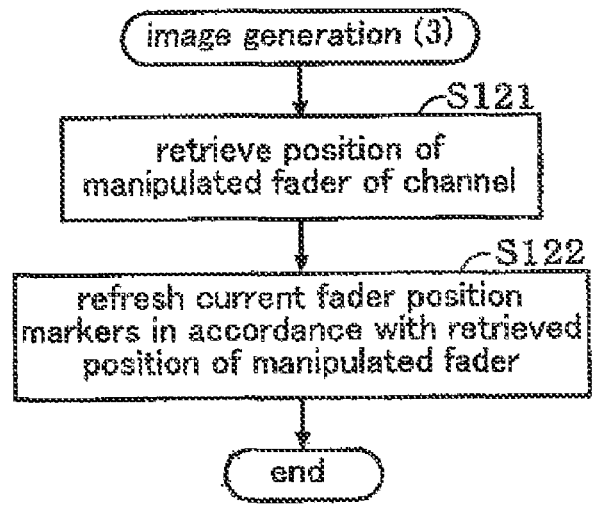
FIG. 10 is a flowchart of an image generation program (3) for generating images of respective current fader position markers of the respective channels.

An image generation program (3) indicated in FIG. 10 is carried out when the fader operator of a channel has been manipulated or when the refreshing of the level meter images has been demanded. In the image generation program (3), the CPU 82 retrieves the position of the manipulated fader of the channel (S121). The CPU 82 then refreshes the current fader position markers $44_1$ to $44_{16}$ of FIG. 4A and FIG. 4B in accordance with the retrieved position of the manipulated fader to generate an image of the current fader position markers for each level meter block image (S122).

Figure 11:
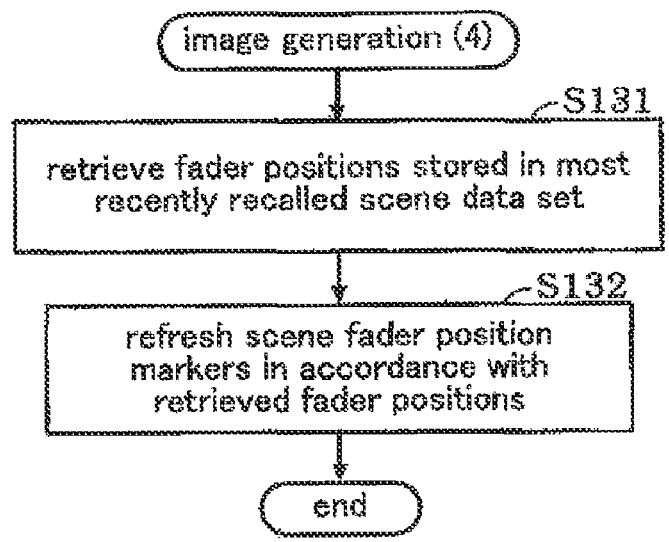
FIG. 11 is a flowchart of an image generation program (4) for generating images of respective scene fader position markers of the respective channels.

An image generation program (4) indicated in FIG. 11 is carried out when scene data is recalled or when the refreshing of the level meter images has been demanded. In the image generation program (4), the CPU 82 retrieves fader positions stored in the most recently recalled scene data set (S131). The CPU 82 then refreshes the scene fader position markers $45_1$ to $45_{16}$ of FIG. 4A and FIG. 4B in accordance with the retrieved fader positions to generate an image of the scene fader position markers of the most recently recalled scene for each level meter block image (S132).

Figure 12:
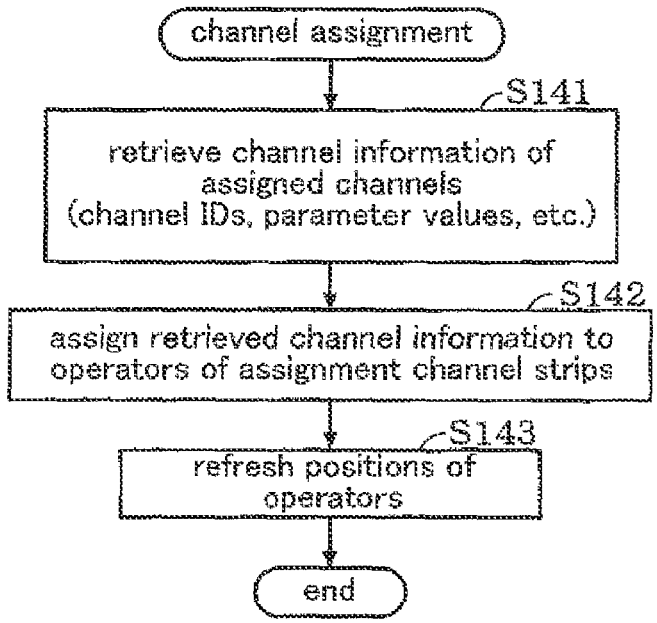
FIG. 12 is a flowchart of a channel assignment program.

A channel assignment program indicated in FIG. 12 is carried out when a manipulation of selecting channels which are to be assigned has been made or when the refreshing of the level meter images has been demanded. In the channel assignment program, the CPU 82 retrieves channel information (channel IDs, parameter values, etc.) of the channels which are to assign (S141). The CPU 82 then assigns the retrieved channel information to the respective operators of the assignment channel strips $24_1$ to $24_{16}$ of FIG. 3 (S142), refreshes respective positions of the fader operators (moving faders) and the like, and refreshes the displayed operators and the displayed parameter values of the assignment channel strips (screen) $27_1$ to $27_{16}$ (S143) to execute the channel assignment.

Figure 13:
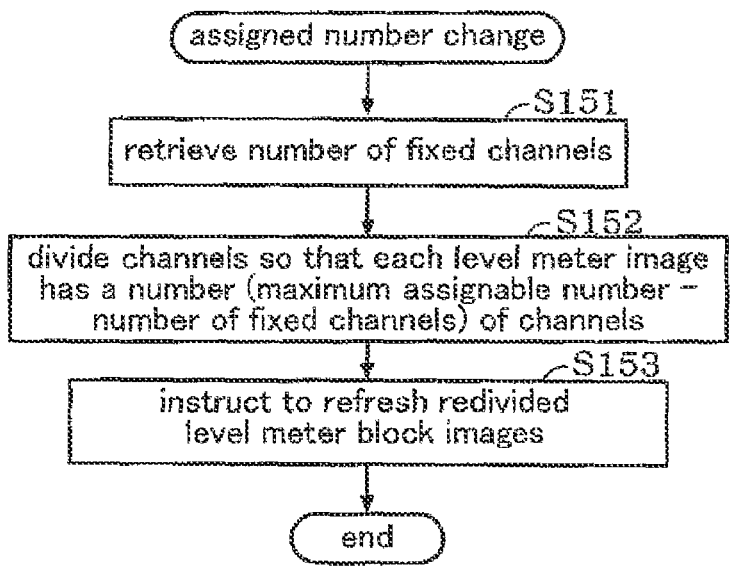
FIG. 13 is a flowchart of an assigned number change program.

An assigned number change program indicated in FIG. 13 is carried out when a demand for changing the number of assigned channels has been detected. The change in the number of assigned channels is equivalent to a change from the assignment selection portion 2 of FIG. 3 to the assignment selection portion 71 of FIG. 6 and vice versa. In the assigned number change program, the CPU 82 retrieves the number of fixed channels (S151). The CPU 82 then redivides (or regroups) the channels that are to be indicated by the level meter images so that each level meter image will have a number of channels, the number being obtained by subtracting the fixed number from the maximum assignable number (S152). The maximum assignable number is the number of assignment channel strips $24_1$ to $24_{16}$, whereas the number of fixed channels is 8 in the example of FIG. 6. The CPU 82 then instructs to refresh the redivided level meter images (S153). By execution of the programs indicated in FIGS. 8 to 12, the respective images are generated on the condition provided after the redivision.

In the above description, the audio mixing apparatus is designed such that the user selects a channel block which the user desires to assign to the assignment channel strip portion 24 by touching one of the level meter block images $2_1$ to $2_m$ displayed on the main display 23 of the main top panel 21. However, the audio mixing apparatus may be modified to be provided with a touch panel sub-display which is not shown in the space between the upper channel strip portion 30 and the lower channel strip portion 31 of the sub-top panel 22 to eliminate the assignment selection portions 32, 33.

The audio mixing apparatus may be also designed such that the sub-display has level meter block images of all the channels assignable to the upper channel strip portion $30_1$ to $30_{16}$ and the lower channel strip portion $31_1$ to $31_{16}$ so that the user will touch one of the level meter block images to select a channel block which is to be assigned to the upper channel strip portion 30 and the lower channel strip portion 31, the level meter block images being similar to the above-described level meter block images $2_1$ to $2_m$.

The audio mixing apparatus is designed such that the sub-top panel 22 is provided on the left of the main top panel 21. However, the audio mixing apparatus may be designed to further include a second sub-top panel on the right of the main top panel 21. Alternatively, the audio mixing apparatus may be provided only with the main top panel 21. In a case where the sub-top panel 22 has the above-described touch panel sub-display with an assignment selection portion formed of the level meter block images being provided on the touch panel sub-display, the audio mixing apparatus may be provided only with the sub-top panel 22.

The above-described audio mixing apparatus is designed to have the touch panel display. Even as for a modified audio mixing apparatus having no touch panel, however, the user is able to perform similar channel block selection by manipulating a mouse to select one of the displayed level meter block images $2_1$ to $2_m$. Furthermore, even the audio mixing apparatus having the touch panel display may allow the user's channel block selection by use of the mouse.

What is claimed is:

1. An audio mixing apparatus comprising:
    a plurality of faders that control tone volume parameters of a plurality of channels respectively in accordance with current positions;
    a display that displays respective signal levels of the channels as a level meter image;
    a signal level storing device that stores the respective signal levels of the respective channels;
    a signal type storing device that stores signal types to be set for the channels, each signal type indicating whether a signal of a channel of the signal type is correlated with that of its neighboring channel to control the channel so that when the signal type of the channel indicates that there is a signal correlation between the channel and its neighboring channel, the fader of the channel and that of the neighboring channel are situated at the same position; and
    a controller that:
        generates the level meter image using respective bars of a bar graph indicative of the respective signal levels of the channels stored in the signal level storing device;
        generates an image indicative of indicators of the channels, respectively, so that the respective indicators correspond to the respective bars of the bar graph indicative of the channels, the indicators being designed so that when the signal type of the channel stored in the signal type storing device indicates that there is the signal correlation between the channel and its neighboring channel, the indicator of the channel has a connected shape shared with the neighboring channel; and
        synthesizes the generated images to display the synthesized image on the display.

2. The audio mixing apparatus according to claim 1, further comprising:
    a fader position storing device that stores respective positions of the faders of the channels,
    wherein the controller:
    generates an image for superimposing respective fader position markers of the channels indicative of respective current positions of the faders of the channels stored the fader position storing device on the respective bars of the bar graph indicative of the channels so that when the signal type of the channel stored in the signal type storing device indicates that there is the signal correlation between the channel and its neighboring channel, the fader position marker of the channel has a connected shape shared with the neighboring channel; and
    synthesizes the generated images to display the synthesized image on the display.

3. The audio mixing apparatus according to claim 1, further comprising:
    a scene data storing device that stores respective positions of the faders of the channels as scene data at the time of storage of a scene,
    wherein the controller generates an image for superimposing respective fader position markers of the respective channels indicative of the respective fader positions of the channels stored as the scene data in the scene data storing device on the respective bars of the bar graph indicative of the channels, and synthesizes the generated images to display the synthesized image on the display.

4. The audio mixing apparatus according to claim 1, further comprising:
    a channel color storing device that stores colors set for the channels,
    wherein the controller displays the respective indicators in the respective colors stored for the channels in the channel color storing device.

5. The audio mixing apparatus according to claim 1, further comprising:
    a touch detecting circuit that detects an area where a user has touched on the display, the display being a touch panel display; and
    a plurality of assignment channel strips,
    wherein the controller generates, as the level meter image, a plurality of blocks of level meter images each of which indicates a corresponding block of the channels divided into a certain number of blocks, and
    wherein the controller detects a user's touch of one of the level meter images displayed on the touch panel display on the basis of an output of the detection by the touch detecting circuit to select a block of channels corresponding to the touched level meter image and assigns the selected channels to the assignment channel strips, respectively.

6. The audio mixing apparatus according to claim 1, wherein:
the signal level storing device comprises a RAM, and
the signal type storing device comprises a flash ROM.

7. A non-transitory computer-readable storage medium storing an audio mixing program executable by a computer to execute a method of controlling a tone volume parameter of each of a plurality of channels in accordance with a current position of a fader of the each channel and to display respective signal levels of the channels as a level meter image on a display, the method comprising the steps of:
storing the respective signal levels of the channels into in a signal level storage device;
storing signal types to be set for the channels in a signal type storage device, each signal type indicating whether a signal of a channel of the signal type is correlated with that of its neighboring channel to control the channel so that when the signal type of the channel indicates that there is a signal correlation between the channel and its neighboring channel, the fader of the channel and that of the neighboring channel are situated at the same position; and
generating the level meter image using respective bars of a bar graph indicative of the respective signal levels of the channels stored in the signal level storage device;
generating an image indicative of indicators of the channels, respectively, so that the respective indicators correspond to the respective bars of the bar graph indicative of the channels, the indicators being designed so that when the signal type of the channel stored in the signal type storage device indicates that there is the signal correlation between the channel and its neighboring channel, the indicator of the channel has a connected shape shared with the neighboring channel; and
synthesizing the generated images to display the synthesized image on the display.

8. The non-transitory computer-readable storage medium according to claim 7, wherein:
the signal level storing device comprises a RAM, and
the signal type storing device comprises a flash ROM.

9. An audio mixing apparatus comprising:
a plurality of faders that control tone volume parameters of a plurality of channels respectively in accordance with current positions;
a display that displays respective signal levels of the channels as a level meter image;
a signal level storing device that stores the respective signal levels of the respective channels;
a fader position storing device that stores respective positions of the faders of the channels; and
a controller that:
generates the level meter image using respective bars of a bar graph indicative of the respective signal levels of the channels stored the signal level storing device;
generates an image for superimposing respective fader position markers of the channels indicative of respective current positions of the faders of the channels stored in the fader position storing device on the respective bars of the bar graph indicative of the channels; and
synthesizes the generated images to display the synthesized image on the display.

10. The audio mixing apparatus according to claim 9, further comprising:
a scene data storing device that stores respective positions of the faders of the channels as scene data at the time of storage of a scene,
wherein the controller generates an image for superimposing respective fader position markers of the respective channels indicative of the respective fader positions of the channels stored as the scene data in the scene data storing device on the respective bars of the bar graph indicative of the channels, and synthesizes the generated images to display the synthesized image on the display.

11. The audio mixing apparatus according to claim 10, wherein:
the scene data storing device stores a plurality of scene data sets, and
the controller generates an image for superimposing the respective fader position markers of the channels indicative of respective positions of the respective faders of the channels stored as part of a scene data set read most recently from the scene data storing device on the respective bars of the bar graph indicative of the channels.

12. The audio mixing apparatus according to claim 9, further comprising:
a channel color storing device that stores colors set for the channels,
wherein the controller generates an image indicative of respective indicators of the respective colors stored in the channel color storing device for the respective channels so that the respective indicators correspond to the respective bars of the bar graph indicative of the channels, and synthesizes the generated images to display the synthesized image on the display.

13. The audio mixing apparatus according to claim 9, further comprising:
a touch detecting circuit that detects an area where a user has touched on the display, the display being a touch panel display; and
a plurality of assignment channel strips,
wherein the controller generates, as the level meter image, a plurality of blocks of level meter images each of which indicates a corresponding block of the channels divided into a certain number of blocks, and
wherein the controller detects a user's touch of one of the level meter images displayed on the touch panel display on the basis of an output of the detection by the touch detecting circuit to select a block of channels corresponding to the touched level meter image and assigns the selected channels to the assignment channel strips, respectively.

14. The audio mixing apparatus according to claim 9, wherein:
the signal level storing device comprises a RAM, and
the fader position storing device comprises a flash ROM.

15. A non-transitory computer-readable storage medium storing an audio mixing program executable by a computer to execute a method of controlling a tone volume parameter of each of a plurality of channels in accordance with a current position of a fader of the each channel and to display respective signal levels of the channels as a level meter image, the method comprising the steps of:
storing the respective signal levels of the channels in a signal level storage device;
storing respective positions of the respective faders of the channels into a fader position storage;

generating the level meter image using respective bars of a bar graph indicative of the respective signal levels of the channels stored the signal level storage device;

generating an image for superimposing respective fader position markers of the channels indicative of respective current positions of the respective faders of the channels stored in the fader position storage device on the respective bars of the bar graph indicative of the channels; and synthesizing the generated images to display the synthesized image on the display.

16. The non-transitory computer-readable storage medium according to claim 15, wherein:

the signal level storing device comprises a RAM, and the fader position storing device comprises a flash ROM.

* * * * *